July 17, 1934.   W. S. WILKINSON   1,966,605
DISPLAY COMBINATION ROAD MAP AND ROUTE INDICATOR
Filed Feb. 21, 1933   12 Sheets-Sheet 4

Patented July 17, 1934

1,966,605

UNITED STATES PATENT OFFICE 1,966,605

DISPLAY COMBINATION ROAD MAP AND ROUTE INDICATOR

William Sumner Wilkinson, Cranford, N. J.

Application February 21, 1933, Serial No. 657,775

12 Claims. (Cl. 40—42)

One object of my invention relates to the display, at any desired place in an automobile, car or conveyance, of a map and the individual route being traversed.

Another object of the invention is to provide a visible moving indicator to traverse the route and said indicator will at all times indicate the position of the automobile, car or conveyance on the route.

Another object is to provide means for manually resetting the indicator to proper position on the "route" and to compensate for detours, inequalities between the actual mileage covered by the conveyance and the mileage recorded on the speedometer or other recording device.

Another object is to provide means by which a large number of maps and separately all corresponding routes can be stored on reels and any map selectively, can be manually positioned and any route selectively, can be automatically positioned, in the line of vision.

Another object is to provide means by which the indicator operating mechanism is directly connected to, rotated by and timed by the movement of the "one mile per revolution" wheel of the speedometer, or similarly by other device timed to the movement of the "conveyance" over route.

Another object is to provide means by which the indicator operating mechanism is controlled electrically, or by fluid or gases, and timed by the movement of the "one mile per revolution" wheel of the speedometer, or similarly by other device timed to the movement of the "conveyance" over the route.

I have referred to a visible moving indicator, traversing a relatively fixed route; either directly connected to, or remotely controlled by the speedometer, or other device timed to the movement of the conveyance over the route and will hereinafter refer to this as the moving indicator type.

I now refer to a moving route and a relatively fixed indicator, which will hereinafter be referred to as the moving route type.

Further objects will hereinafter appear.

The invention further relates to certain novel features of construction and arrangement of parts, which will readily be understood by reference to the description of drawings, and to the claims to be hereinafter given.

For the purpose of illustrating the invention, certain forms thereof are shown in the drawings although it is to be understood, that the various instrumentalities of which the invention consists can be variously arranged and organized and the invention is not limited to the precise arrangement and organization of these instrumentalities herein shown and described except as required by the scope of the appended claims.

Of the drawings illustrating the device:

Fig. 17 is a vertical section through the main switch on line 17—17 Fig. 12.

Of the elementary wiring diagrams illustrating the circuit breaker and main switch; Fig. 21 at mid position and Fig. 22 positioned at extreme right movement of the main switch.

Figure 23:
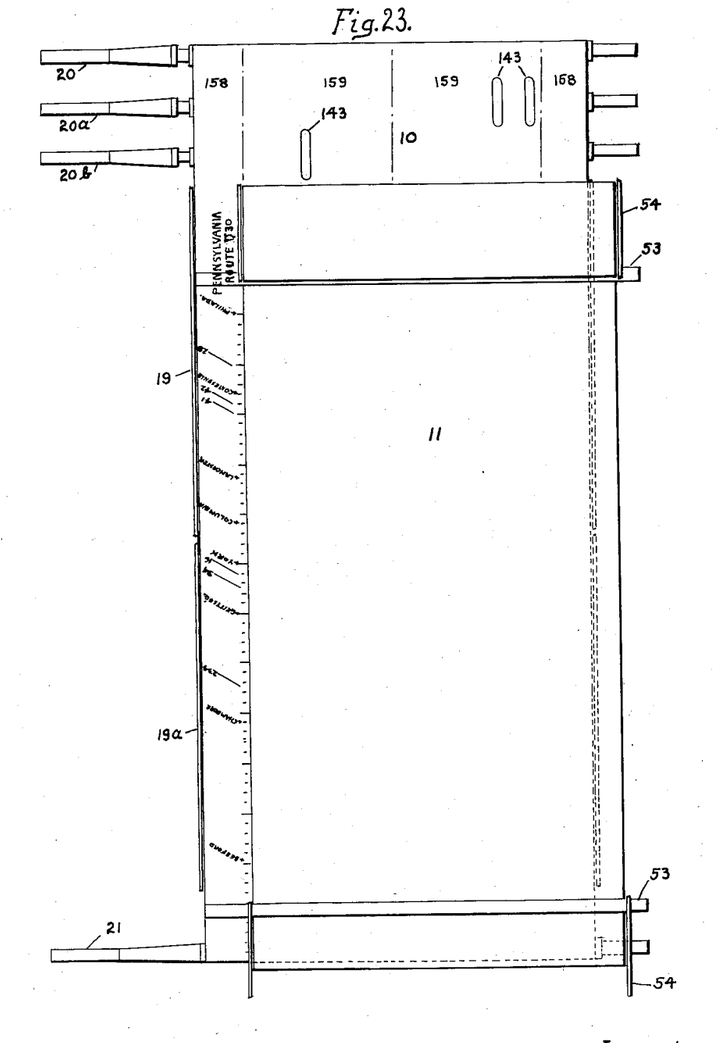
Fig. 23 illustrates the map sheet positioned over the route sheet of the moving indicator type and Fig. 24 the route sheet, moving route type.
Figure 24:
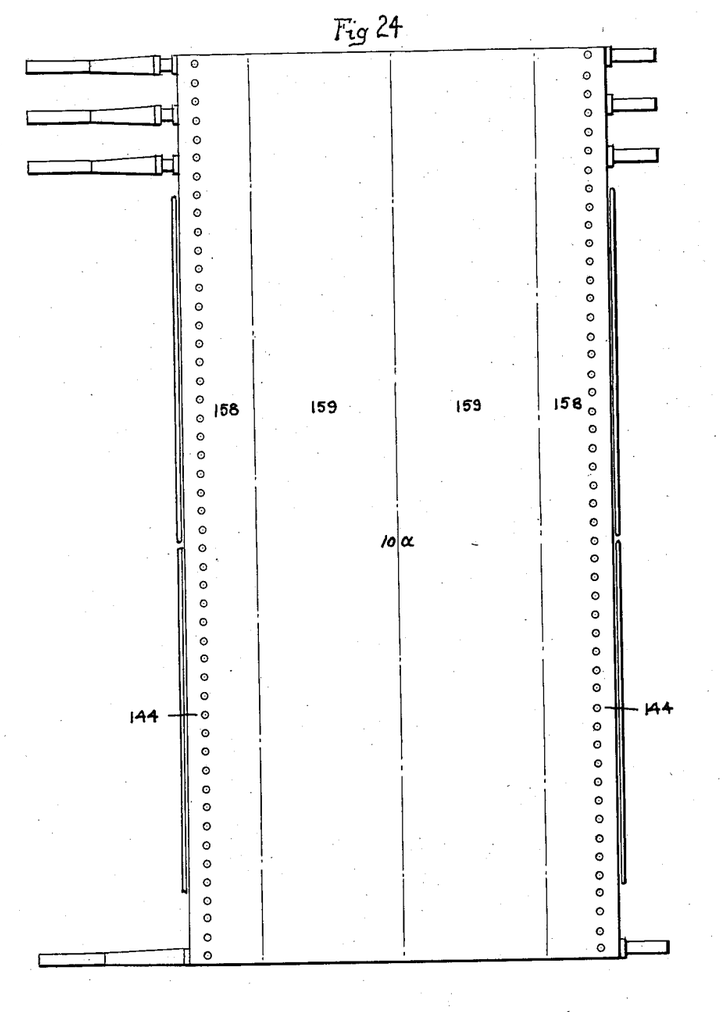
Figure 25:
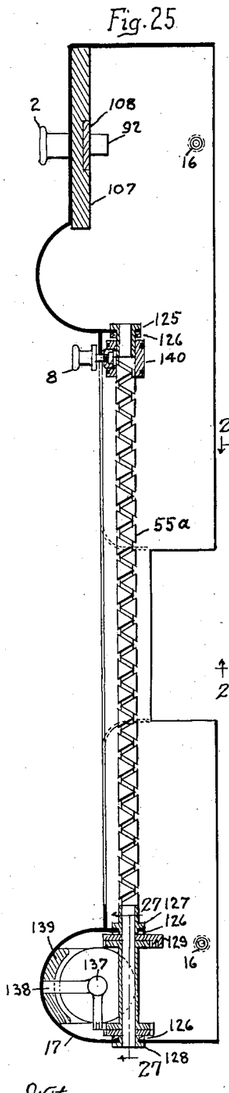
Fig. 25 is a vertical section of cover on line 4—4 Fig. 1, modified to illustrate the indicator screw and associated parts of the remote control moving indicator type.
Figures 26, 27, 28, 29, 30, 31:
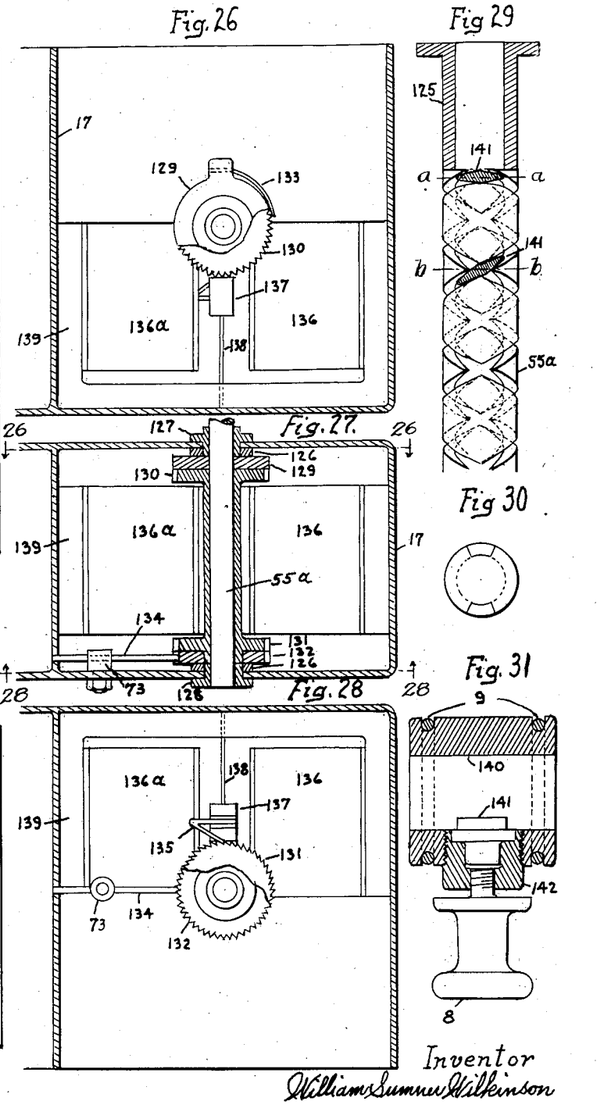
Fig. 26 is a vertical section on line 26—26 Fig. 27.
Fig. 27 is a section on line 27—27 Fig. 25.
Fig. 28 is a vertical section on line 28—28 Fig. 27.
Fig. 29 is a development of the indicator screw 55a illustrating two positions of the indicator nut thread guide 141; one position line b—b at the intersection of right hand and left hand threads and one position line a—a at the ends of the threads and illustrating the engagement of the thread guide 141 with one hand thread from the opposite hand thread of the indicator screw.
Fig. 30 is an end view of the indicator screw 55a Fig. 29.
Fig. 31 is a sectional drawing illustrating the construction of the indicator nut, thread guide and associated parts.

For the guidance of motorists and others I have developed a map sheet 11 Fig. 23 and route and information sheets 10 Fig. 23 and 10a Fig. 24, all conveniently stored on reels and containing the essential information usually to be found in guide books and on road maps.

The map sheet 11 Fig. 23 is a continuous sheet of transparent material and has printed thereon maps in pairs, i.e., two maps and one clear space then repeated until all the desired maps are printed on the sheet. The maps will be similar to and contain the usual information to be found on road maps now in common use.

Figures 3, 4:
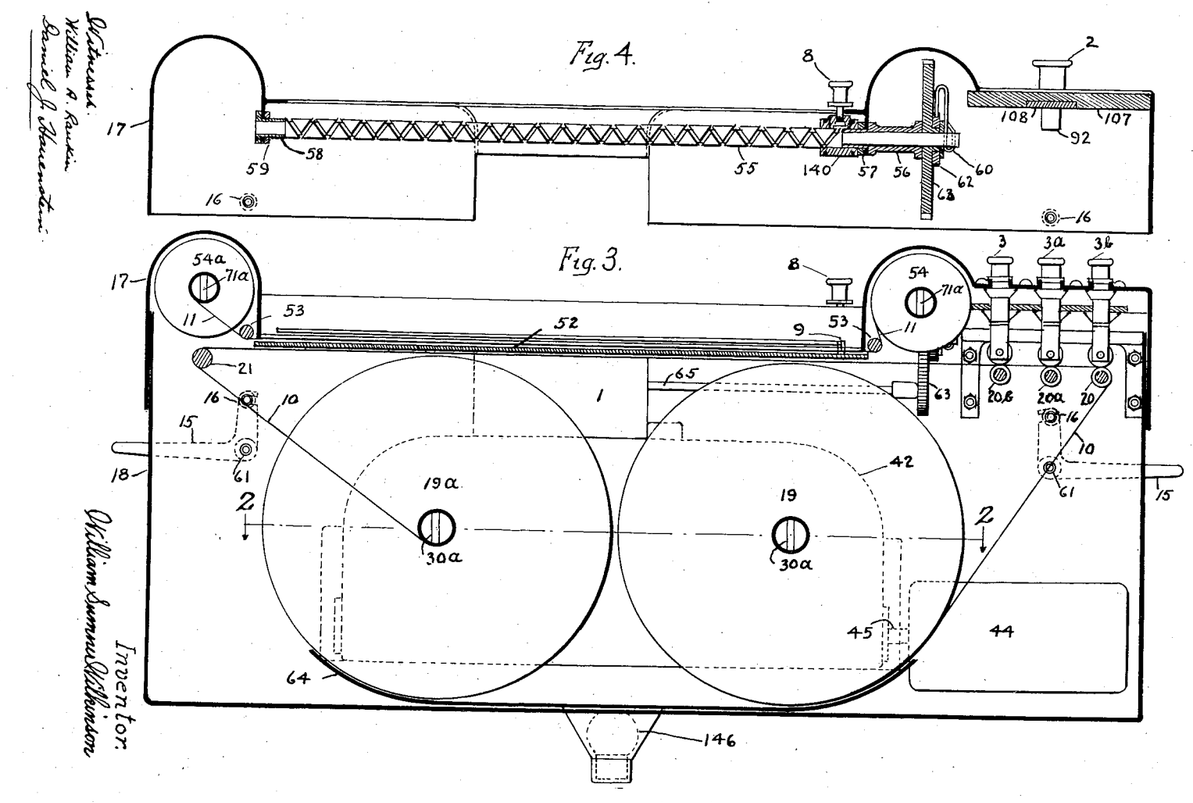
Fig. 3 is a vertical section on line 3—3 Fig. 1.
Fig. 4 is a vertical section on line 4—4 Fig. 1 and illustrating the construction of the indicator screw and associated parts of the moving indicator type connected directly to the speedometer.
Figure 5:
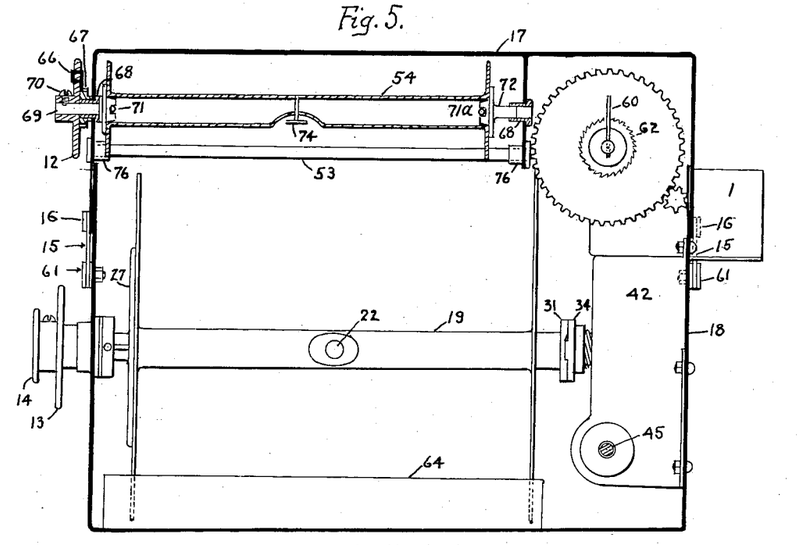
Fig. 5 is a vertical section on line 5—5 Fig. 1.
Figure 6:
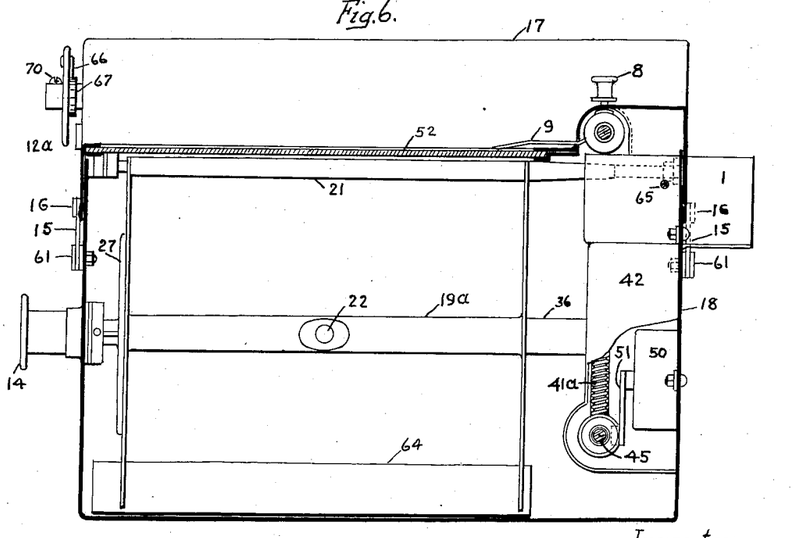
Fig. 6 is a vertical section on line 6—6 Fig. 1.

The ends of the map sheet are attached to hooks 74 Fig. 5, fastened to reels 54 and 54a; and guided by rollers 53 over transparent glass window 52 Figs. 3 and 6. Manually positioning the clear space of the map sheet over the glass window 52 permits reading of useful information printed on route and information sheets 10 Fig. 23 and 10a Fig. 24 as hereinafter described.

The route sheet 10 Fig. 23 (of the moving indicator type) has noted on marginal space 158, Pennsylvania route 30; and for illustrating purposes a number of cities also routes crossing route 30. All are located on a scale of miles. There is a corresponding sequence of groups of routes for each map, printed on margins 158 of route sheet 10 Fig. 23 and 10a Fig. 24 (the moving route type sheet). Printed on the "route" are all cities, towns and villages by name and all cross routes by number; all to scale of miles. This scale of miles will have mileage intervals noted thereon in both directions of the scale. Therefore miles traversed on the route in either direction will be read directly from the scale of miles.

Useful information printed in spaces 159 Figs. 23 and 24 will consist of a tabulation of the cities, towns and villages of corresponding route, each and severally followed by notations of places of interest, hotels, tourists lodgings, camps, garages and advertisements. Additional memoranda can be noted thereon by motorists.

Circuit breaker perforations 143 are positioned on route sheet 10 to trip the circuit breaker corresponding to route number 30, indicated on the automatic route positioning device as hereinafter described.

Figure 34:
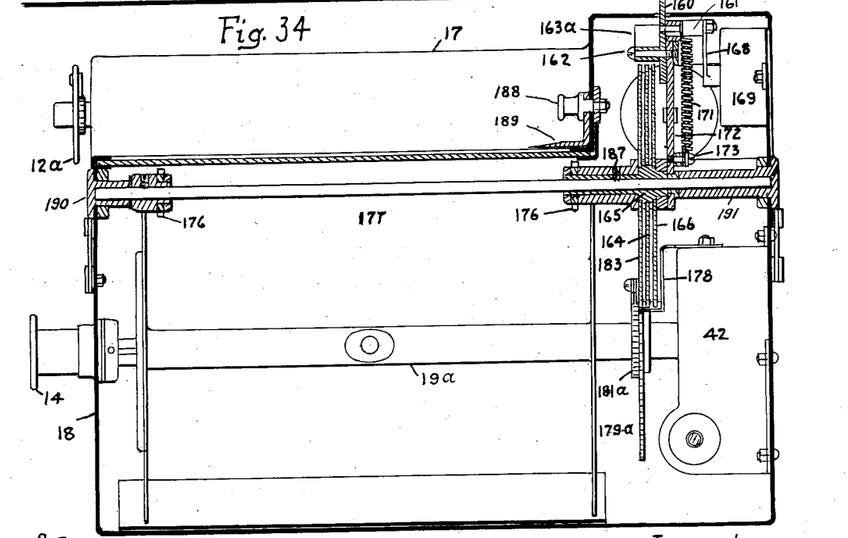
Fig. 34 is a vertical section on line 34—34 Fig. 32.

Route sheet 10a Fig. 24 similar to route sheet 10 Fig. 23 is modified by adding the perforations 144, which time the movement of route over sprockets 176 Fig. 34.

Figure 2:
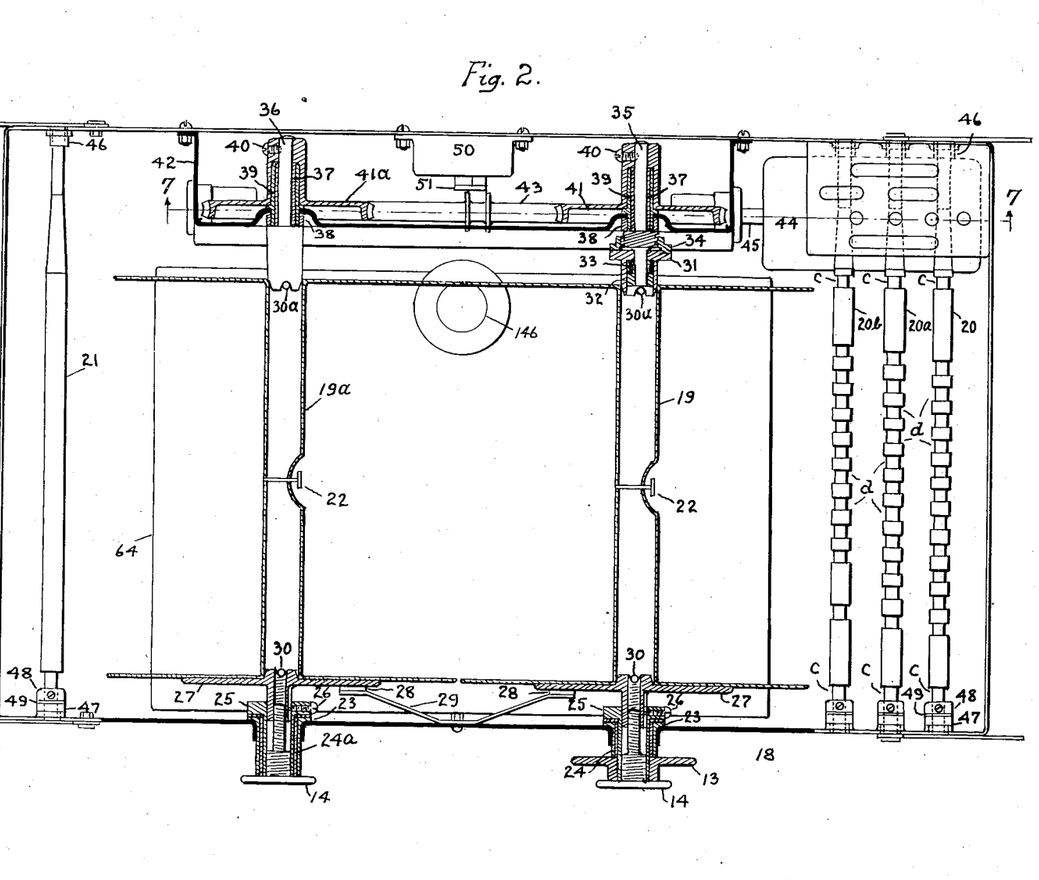
Fig. 2 is a plan view after removing the cover Fig. 1 and it is in partial section on line 2—2 Fig. 3.

The ends of the route sheets are attached to hooks 22 Fig. 2 fastened to reels 19 and 19a, and guided by rollers 20, 20a, 20b, and 21, under the transparent glass window 52 Figs. 3 and 6.

Each map will be numbered and each corresponding group of routes will be similarly numbered in orderly sequence 20, 21, 22, etc., from right to left. Each route of a group will be numbered in orderly sequence 1, 2, 3, etc., from right to left, and the individual number of the route will correspond with number officially designated on the road maps in common use.

The system of numbering described, indicates at all times the desired direction of movement of route sheets 10 Fig. 23 and 10a Fig. 24. With circuit breakers positioned for any number, movement of master switch button 2 Fig. 1 to extreme right position results in movement of the route sheet in direction left to right and moving master switch button 2 Fig. 1 to extreme left position results in movement of the route sheet in direction right to left.

Referring to Figs. 1, 2, 3, 4, 5 and 6:

Disconnecting latches 15, free to rotate on pin 61 fastened to case 18; from pin 16 fastened to cover 17, permits removal of cover 17 and all parts attached thereto. When planning a trip, cover 17 can be placed in a convenient position and notations made on the map covering the route or routes to be traversed and cross route turning points noted; and these notations after serving the purpose for which they were made, can be erased.

Figure 1:
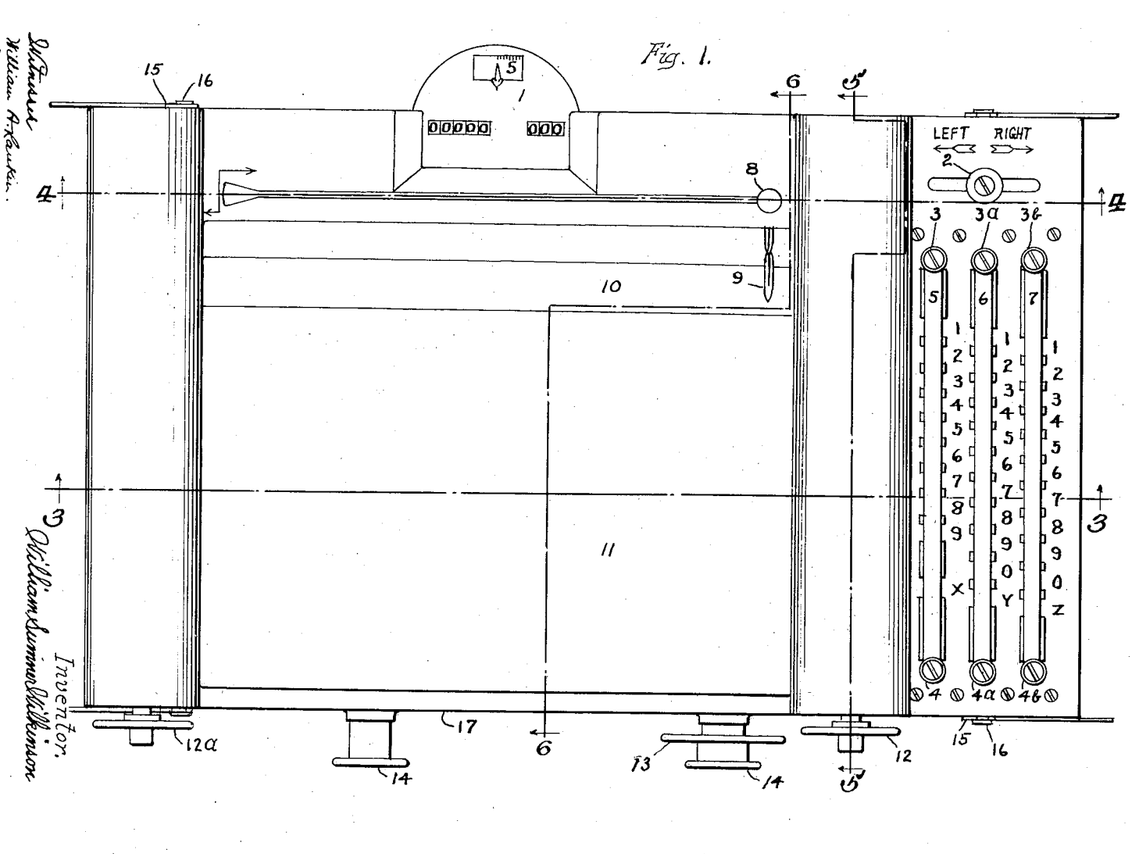
Fig. 1 is a plan view.

Referring to Figs. 1, 5 and 6:

The speedometer 1 is fastened to case 18. The master switch button 2, circuit breaker buttons 3, 3a and 3b and interlock buttons 4, 4a and 4b are all shown in neutral positions. The slot 5 in cover 17 and column of numbers 1 to 9 and the letter X are used for indicating route numbers 1 to 9, inclusive. Slot 6 and column of numbers 1 to 0 and the letter Y in combination with numbers 1 to 9 slot 5 are used to indicate route numbers 10 to 99, inclusive. Slot 7 and column of figures 1 to 0, in combination with numbers of slots 5 and 6 are used to indicate route numbers 100 to 999, inclusive. Numbers of slots 6 and 7 in combination with letter Z slot 7 are used for indicating route groups numbered 20 to 99, inclusive.

To automatically position, within the range of vision under glass window 52 Fig. 3 any route of any group of routes printed on route sheet 10: Assume for explanatory purposes, route 12 of route group 20 is positioned under glass 52 and it is desired to position first route 3 then route 36 and finally route 368 all of route group 28. Proceed as follows: Move circuit breaker button 3a down slot 6 to number 2; move button 3b down slot 7 to number 8; move interlock button 4b up slot 7 to letter Z. Move master switch button 2 to extreme right closing electric circuit of motor 44 Fig. 2. Through mechanism hereinafter described the rotation of motor shaft 45 Fig. 2 rotates reel 19 Fig. 2 and route 1 of route group 28 is positioned under glass 52 when circuit breakers open motor circuit and movement ceases. Return all buttons 2, 3a, 3b and 4b to neutral positions.

Now move button 3 down slot 5 to number 3 and button 4 up slot 5 to letter X. Move button 2 to extreme right closing motor circuit and route 3 will be positioned under glass 52. Circuit breaker opens motor circuit and movement ceases. Return all buttons to neutral position.

Similarly to position route 36, move button 3 down slot 5 to number 3; move button 3a down slot 6 to number 6; move button 4a up slot 6 to letter Y. Move button 2 to extreme right. This setting of the several buttons will result in the positioning of route 36. Return all buttons to neutral position.

Similarly to position route 368, move button 3 down slot 5 to number 3, move button 3a down slot 6 to number 6, move button 3b down slot 7 to number 8. Move button 2 to extreme right. This setting of the several buttons will position route 368. Return all buttons to neutral position.

Similarly to reverse the movement of route sheet 10 when positioning a lower numbered route than the one then positioned. Circuit breaker and interlock buttons are set opposite the required numbers and respective letter as previously explained, and the switch button 2 is moved to extreme left resulting in a reversal of the rotation of motor shaft 45 and engaging of reel 19a resulting in the desired route being positioned.

The circuit breakers and interlocks are similar in construction and all function as circuit breakers. The method of indicating the desired route permits positioning any route in either direction of movement of route sheet 10 Fig. 23.

Referring to Figs. 3, 5 and 6:

Map reels 54 and 54a are manually operated when a particular map is to be positioned over glass window 52. Rotating disc 12 clockwise results in map sheet 11 moving from left to right and similarly rotating disc 12a results in map sheet 11 moving from right to left. Discs 12 and 12a are fastened respectively to pins 69 by screw 70. Pin 69 rotates in bushing 68 fastened to cover 17. Grooved end of pin 69 engages pin 71 fastened to reels 54 and 54a respectively. Pin 71a fastened to reels 54 and 54a respectively engage groove in end of pin 72 rotating bushing 68, which in turn is fastened to cover 17. Moving pin 72 axially, disengages reels 54 and 54a respectively, permitting removal of reels. The map sheet 11 is guided over rollers 53 free to rotate in bushing 76 in turn fastened to cover 17.

Tension is maintained in map sheet 11 through spring pawl 66 fastened to discs 12 and 12a respectively and engaging ratchet wheel 67 fastened to bushing 68.

Referring to Figs. 2, 3, 5, 6 and 7:

Route sheet reels 19 and 19a are selectively operated by motor 44 rotating shaft 45 running in bushings 82 fastened to bearings 81 in turn fastened to worm gear case 42. Driving pin 78 fastened to shaft 45 engages slots 79 in worm sleeve 43, and rotates worms 77 and 77a. Bushings 83 are fastened to sleeve 43 and are a sliding fit on shaft 45. Thrust collars 80 free to rotate on shaft 45 receive the thrust of worm sleeve 43. The threads of worms 77 and 77a are right handed.

Rotating motor shaft 45 in one direction engages worm 77 with worm wheel 41 and reversing the direction of rotation of shaft 45 disengages worm 77 resulting in axial movement of sleeve 43 and engagement of worm 77a with worm wheel 41a and simultaneously sleeve 43 contacting lever 51 closes electric switch 50.

Worm wheel 41 Fig. 2 is fastened to pin 35 by screw 40. Pin 35 rotates in bushing 37 fastened to bearing 39 in turn fastened to worm gear casing 42 by collar 38. The threaded portion of pin 35 engages clutch nut 34 in turn engaging clutched sleeve 31, the grooved end of which engages pin 30a fastened to reel 19. The clutch drive 31, 34 is disconnected when reel 19 is manually rotated in the same direction as when rotated by motor 44.

Manually rotating clockwise, disc 13 fastened to sleeve 25 rotating in bushing 24 fastened to bearing 23 in turn fastened to case 18; and through screw 26 engaging groove in hub of flanged sleeve 27, and groove in end of 27 engaging pin 30 fastened to reel 19, rotates reel and pin 30a fastened thereto. Pin 30a engaging grooved end of clutch sleeve 31 rotates both 31 and clutch nut 34. Clutch sleeve 31 moves axially on pin 35 and is held in contact with clutch nut 34 by spring 33 bearing against collar 32 fastened to pin 35. Nut 34 rotated by 31, moves axially on threaded portion of pin 35. This axial movement continues until 31 engages the face of threaded portion of pin 35. Further rotation disengages clutch members 31 34.

Worm wheel 41a is fastened to pin 36 by screw 40. Groove in end of pin 36 engages pin 30a fastened to reel 19a.

Friction pads 28 Fig. 2 fastened to spring support 29 and contacting flange sleeve 27, retards rotation, resulting in a tension in route sheet 10.

To disengage reels 19 and/or 19a; rotate counter-clockwise right and left hand screw 14. Right hand thread engages sleeve 25 held against axial movement, and left hand thread engages sleeve 27 free to move axially permitting removal of reels. Curved plate 64 fastened to case 18 is fitted to assist in aligning reels 19 and/or 19a when re-engaging same.

Route sheet guide rollers 20, 20a, 20b and 21 rotate in bushing 46 and 47 fastened to case 18 and are supported axially by collars 48 fastened to rollers and engaging anti-friction washers 49 fitted between 47 and 48.

Route sheets 10 and/or 10a are illuminated by lamp 146 attached to case 18 and wired to the general lighting circuit.

Of the drawings Figs. 1, 4, 5, 6, 29, 30 and 31 illustrating the moving indicator type directly connected to the speedometer: Rotation of the "one mile per revolution wheel" of the speedometer 1 controls the movement of the indicator 9 over the routes printed on route sheet 10. The pinion shaft 65 directly connected to speedometer 1, rotates spur wheel 63 free to rotate on indicator screw 55. Ratchet wheel 62 fastened to spur wheel 63 engaging spring pawl 60, in turn fastened to and rotating indicator screw 55.

Indicator 9 is attached to nut 140 engaging selectively right or left hand thread of indicator screw 55, through thread guide 141 free to rotate in plug 142, fastened to nut 140. Indicator screw 55 rotates in a constant direction and nut 140 moves to right or left (depending on the engagement of the thread guide 141 with either right or left hand threads) to the ends of the threads on indicator screw 55. As illustrated at line a—a Fig. 29, thread guide 141 is leaving one hand thread and engaging the opposite thread. At line b—b thread guide 141 is shown crossing an intersection of the right hand thread with the left hand thread.

Bearings 56 and 58 fastened to cover 17 and secured by collars 57 and 59 respectively, support and also prevent axial movement of indicator screw 55. To position indicator 9, manually, move button 8 Fig. 1 fastened to nut 140 to extreme left hand end of threads on indicator screw 55. Move button 8 up or down, selectively, in enlarged end of slot in cover 17. This movement engages thread guide 141 with right or left hand thread selectively. Move button 8 and indicator 9 to desired position on the route. It is understood that indicator screw 55 will be rotated when manually positioning indicator 9.

The flexible drive, ratchet wheel 62 and pawl 60, permits this rotation independent of rotation of speedometer.

Of the drawings Figs. 8, 25, 26, 27, 28, 29, 30 and 31 illustrating the moving indicator type remote control:

Rotation of the "one mile per revolution wheel" of speedometer, closes and opens alternately through switch 84, the electric circuit of magnets 136 and 136a. Closing of the circuit causes contactor 137 fastened to spring 138 in turn fastened to yoke 139, to contact core of magnet 136; thus advancing pawl 135 engaging with and rotating ratchet wheel 131 free to rotate on indicator screw 55a. Ratchet wheel 130 fastened to 131 engages pawl 133 fastened to disc 129 in turn fastened to and rotating indicator screw 55a. Ratchet wheel 132 fastened to 131 and engaging pawl 134 in turn fastened to cover 17 by 73, holds ratchet wheel 131 in advanced position. Opening of circuit permits spring 138 to reset pawl 135 for next forward movement. Each forward movement of pawl 135 moves indicator 9 Fig. 1 over route one mile to scale. Bearings 125, 127 and 128 fastened to cover 2 by collars 126; support and position axially the indicator screw 55a. Further operation of indicator screw 55a and nut 140 and associated parts also method of manual positioning of indicator 9 is similar to description above of moving indicator type directly connected to speedometer.

Of the drawings Figs. 12, 13, 14, 15, 16, 17, 18, 19, 20, 21 and 22 illustrating the circuit breaker and master switch, and elementary wiring diagrams:

The circuit breakers are engaged when circuit breaker buttons 3, 3a, 3b and interlock buttons 4, 4a, 4b Fig. 1 are positioned opposite the desired route number. They are similar in construction and description of one will apply to all.

Figure 18:
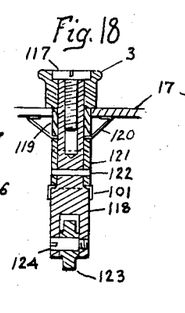
Fig. 18 is a vertical section of circuit breaker and interlock route positioning members and Fig. 19 is a side view of Fig. 18.
Figure 19:
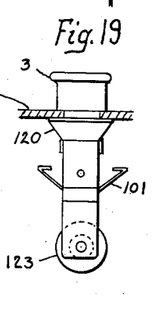

Button 3 Fig. 18 attached to wheel bracket 118 by screw 117 is permitted to move axially by spring 120. This axial movement permits circuit breakers to be raised clear of positioning stops 147. Spring 120 fastened to wheel bracket 118 contacts and is free to slide on cover 17. Contactor 101 is held in position on wheel bracket 118 by rectangular shaped spacer 121 in turn fastened to 118 by pin 122. Spacer 121 contacts sides of contactor bars 94, 95, 95a and 96 which holds device axially, fixes and maintains alignment of wheel 123. Rectangular shape spacer 119 is fitted between button 3 and spring 120. Wheel 123 revolves on pin 124, attached to 118.

When circuit breakers and interlocks are in neutral position, wheels 123 engage grooves "C" of rollers 20, 20a and 20b Fig. 2 and contactors 101, 101a, 101b, 101c, 101d and 101e are disengaged from contactor bars 94, 95, 95a and 96. In operating position, wheels 123 contact route sheet 10 directly above grooves "d" of rollers 20, 20a and 20b as shown in Figs. 2 and 3; and correspond with the number or letter opposite which the circuit breaker buttons 3, 3a, 3b and interlock buttons 4, 4a and 4b are positioned, respectively. Contactors 101, 101a, 101b, 101c, 101d and 101e are engaged with contactor bars 94, 95, 95a and 96. When circuit breaker perforations 143 of route sheet 10 Fig. 23 are positioned directly above grooves "d" in rollers 20, 20a or 20b, wheel 123 is forced into groove by action of spring 120 and simultaneously contactors 101, 101a, 101b, 101c, 101d and 101e break contact with contactor bars 94, 95, 95a and 96 and electric circuit is opened.

The perforations 143 shown on Fig. 23 are positioned for route number 30. Any numbered route will have perforations 143 corresponding thereto. A continuous row of perforations 143 are positioned across each end of route sheet 10 to prevent overtravel.

Contactor bars 94, 95, 95a and 96 are fastened to cover 17 by bolts 110 passing through insulator bushings 111 and insulators 107 and 109. Contactor bars 94 and 95a are coupled together by conductor 98 and contactor bars 95 and 96 are coupled together by conductor 98a.

Master switch: The master switch button 2 attached to contactor slide 108 by bolt 113, spacer 114 and nut 112 is permitted to move axially by spring 115, thus button 2 can be raised clear of counterbore 97 in cover 17 located at neutral position of master switch; and moved to right or left. Bolts 116 attach contactors 92 and 92a to contactor slide 108, free to slide in groove in insulator 107. Contactors 91, 91a, 93, 99, 100, 100a, 100b and 100c are all fastened to insulator bracket 106 which is bolted to case 18.

Parts 106, 107, 108, 109, 111, 118, 119 and 121 are all made of insulating material resistant to electric current.

Figure 20:
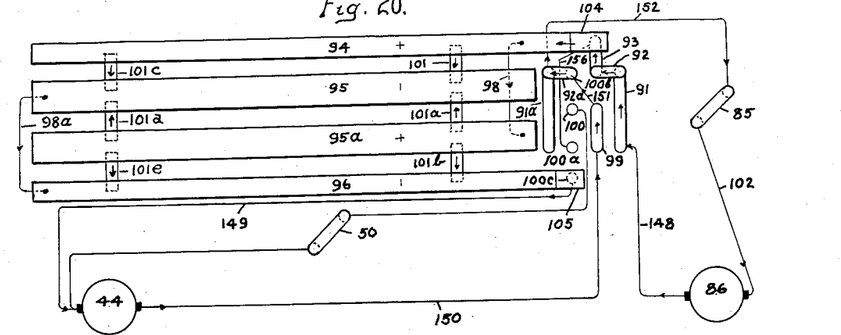
Fig. 20 illustrates the main switch contactors positioned at the extreme left movement of main switch.
Figure 21:
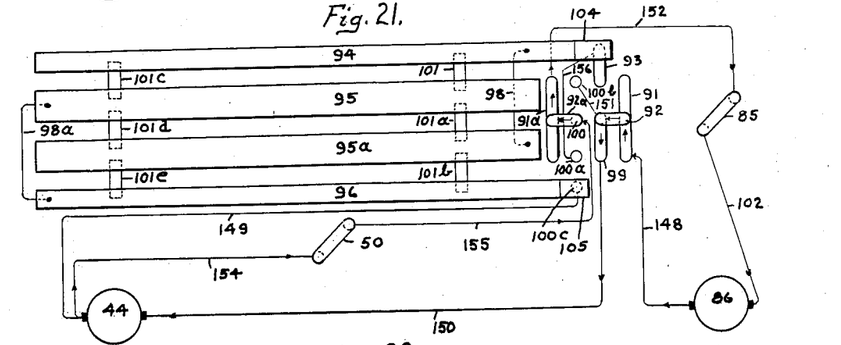

The elementary wiring diagram Fig. 20 represents the master switch button 2, Fig. 1 positioned at extreme left hand movement, and in this position controls the rotation of reel 19a, Fig. 3.

Figure 7:
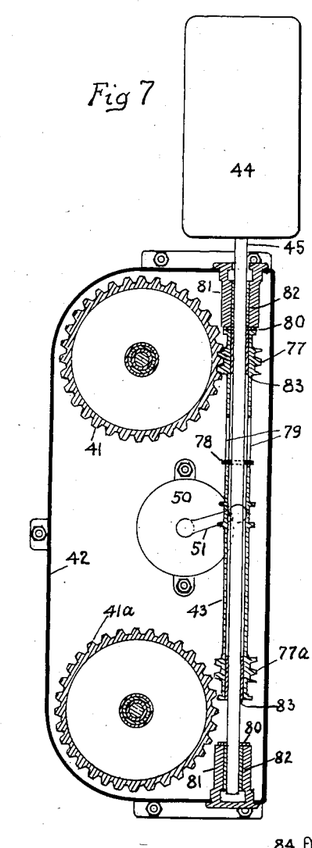
Fig. 7 is a vertical section on line 7—7 Fig. 2 and illustrating the construction of the worm gear drive of route sheet reels.
Figure 8:
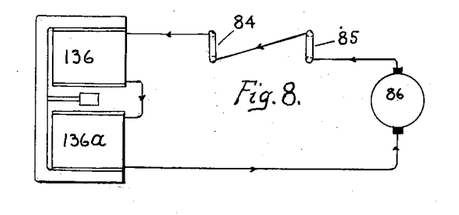
Fig. 8 is an elementary wiring diagram of moving indicator type, remote control by movement of speedometer.

Referring to Fig. 7 worm 77a attached to sleeve 43 moves axially on shaft 45 and engages worm wheel 41a. The sleeve 43 contacts lever 51 and closes electric switch 50.

Referring to Fig. 20: Closing switch 85 interlocked with ignition switch, after setting circuit breaker contactors 101, and/or 101a, and/or 101b, and interlock contactors 101c and/or 101d, and/or 101e, in contact with contactor bars 94, 95, 95a and 96, closes the electric circuit between electric motor 44 and electric generator 86. Electric current from generator 86 through conductor 148 attached to contactor 91 passes through contactors 92, 93, 104 into contactor bar 94 thence through conductor 98 to contactor bar 95a. From contactor bars 94 and 95a through contactors 101, 101a, 101b, 101c, 101d, 101e and conductor 98a into contactor bars 95, and 96. From 96 through contactor 105, contactor 100c, conductor 149 to electric motor 44 and thence through conductor 150 to contactor 99 through conductor 151 to contactors 92a and 91a through conductor 152, switch 85, conductor 102 back to generator 86 completing circuit. Motor will continue to rotate reel 19a until electric circuit is opened at circuit breaker as hereinbefore described.

The elementary wiring diagram 21 represents the master switch button 2, Fig. 1 positioned at neutral position. Electric current from generator 86 through conductor 148 attached to contactor 91 passes through contactors 92 and 99 and conductor 150 to motor 44; thence through conductor 154, switch 50 and conductor 155 to contactors 100, 92a, 91a and conductor 152, switch 85, conductor 102 to generator 86 completing circuit. This positioning of master switch button 2 and associated parts reverses the direction of rotation of motor 44 when compared with diagram 20. This reversal of direction of rotation of motor 44 disengages worm 77a Fig. 7 from worm wheel 41a and engages worm 77 with worm wheel 41. Worm sleeve 43 engaging lever 51 opens switch 50 simultaneously with the axial movement of worms 77 and 77a, and rotation of motor 44 ceases. Thus it will be noted that with master switch button 2 positioned at neutral, worm 77 always engages worm wheel 41; and reel 19a connected to worm wheel 41a is free to rotate when reel 19 is either power or manually rotated.

Figure 22:
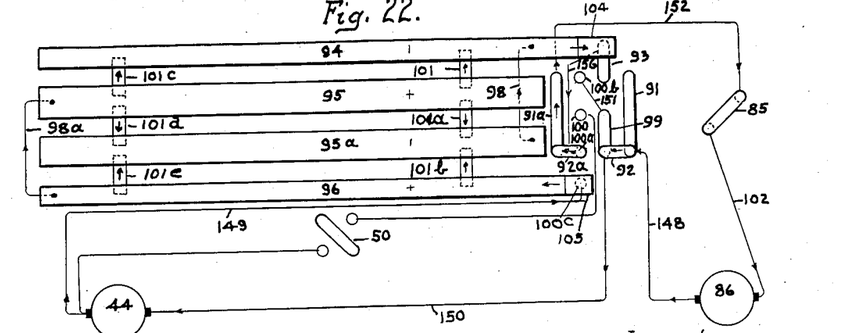

Referring to Fig. 22: Electric current from generator 86, through conductor 148 attached to contactor 91 passes through contactors 92, 99 and conductor 150 to motor 44; thence through conductor 149, contactors 100c and 105 to contactor bar 96, through conductor 98a to contactor bar 95. Thence through contactors 101, 101a, 101b, 101c, 101d, 101e and conductor 98 to contactor bars 94 and 95a; thence through contactors 104 and 93 to conductor 156, contactors 100a, 92a, 91a through conductor 152 switch 85 conductor 102 to generator 86 completing circuit. This positioning of master switch button 2 and associated parts, reverses the direction of rotation of motor 44 when compared with diagram 20, and motor will continue to rotate reel 19 until electric circuit is opened at circuit breaker as hereinbefore described.

I have interlocked the switch 85 with the ignition switch. Opening ignition switch simultaneously opens switch 85. This interlocking arrangement is designed to protect the electric systems described, against possible damage caused by neglect to open switch 85 when car is not in operation.

Referring to moving route type Figs. 9, 10, 11, 24, 32, 33 and 34: Closing ignition switch simultaneously closes switch 85 Figs. 9, 10 and 11. Control lever 160, Figs. 32, 33 and 34, free to rotate on screw 162, is manually moved from neutral position shown to right or left corresponding with the desired direction of travel of route sheet 10a, Fig. 24.

Figure 33:
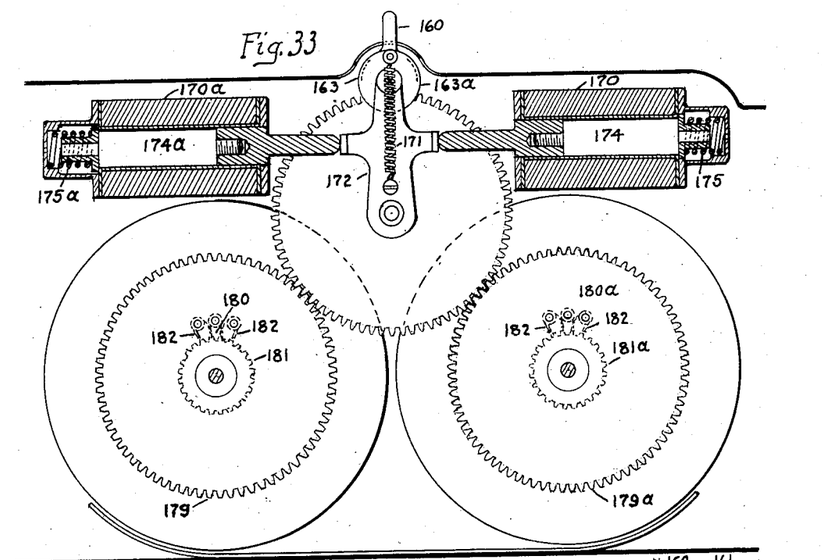
Fig. 33 is a vertical section on line 33—33 of Fig. 32

Positioning control lever 160 to left, Fig. 33 engages pawl 163 with spur gear 164 fastened to bushing 165. Simultaneously pawl 163 also engages spur gear 166 which rotates freely on 165; also stud 161 fastened to lever 160 and engaging lever 168 attached to reversing switch 169 closes electric circuit of solenoid 170. The electric circuit is alternately opened and closed at switch 84 by the rotation of the "one mile per revolution" wheel of speedometer 1, Fig. 1.

Spring 171 attached to lever 172 by screw 173 and to lever 160 by stud 161 holds control lever 160 in any one of three positions, viz., neutral, right or left.

Electric circuit completely closed, solenoid 170 is energized; the core 174 moves to center of magnetic field, spring 175a is compressed. Simultaneously lever 172, free to rotate on sprocket shaft 177 advances pawl 163, moving spur gears 164 and 166 a partial revolution. Spur gear 164 fastened to bushing 165 in turn fastened to sprocket shaft 177 by screw 187, rotates both sprockets 176. These sprockets engaging perforations 144 in route sheet 10a Fig. 24, moves route sheet a distance equal to one mile to scale. Pawl 178 fastened to worm gear case 42 and engaging the teeth of spur gears 164 and 166 holds the gears in advanced position.

The partial revolution of spur gear 166 engaging with spur gear 179 which is free to rotate on clutch nut 34a; and through pawl 180 attached to spur wheel 179 and ratchet wheel 181 attached to clutch nut 34a, rotates clutch sleeve 31a and through pin 30a rotates reel 19. The pawl 180 held in contact with ratchet wheel 181 by springs 182 permits relative movement of the rotating members, thus compensating for difference in degree of movement of route sheet resulting from the rotation of sprockets 176 and reel 19.

Figure 9:
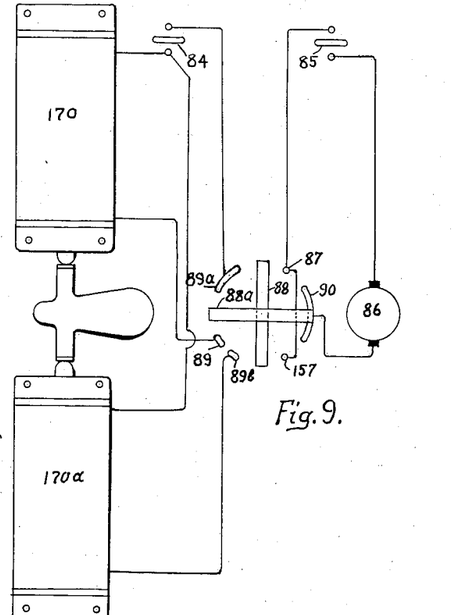
Fig. 9 is an elementary wiring diagram of moving route type all switches in open position.
Figures 10, 11:
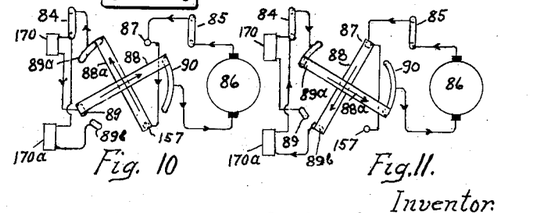
Fig. 10 is an elementary wiring diagram illustrating all switches in closed position for operating the moving route sheet in one direction and Fig. 11 illustrates all switches in closed position for operating the moving route sheet in the opposite direction.
Figure 12:
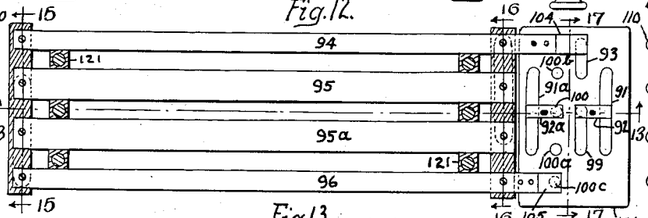
Fig. 12 is a plan view of main switch and circuit breaker in section on line 12—12 Fig. 13.
Figure 13:
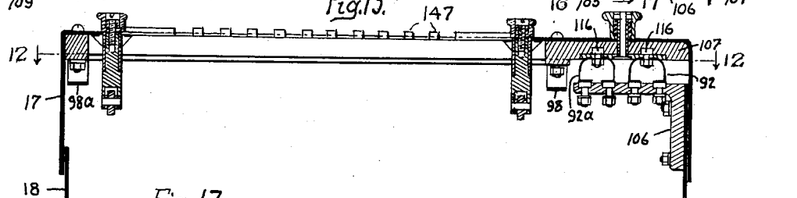
Fig. 13 is a vertical section on line 13—13 Fig. 12.
Figure 14:
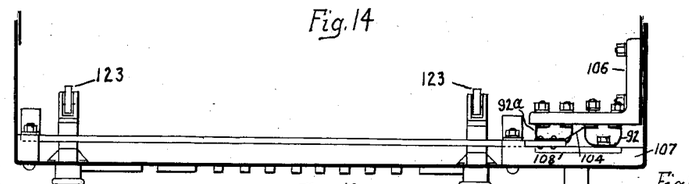
Fig. 14 is a side view of Fig. 12.
Figure 15:
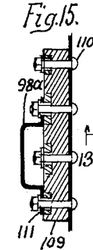
Fig. 15 is a vertical section on line 15—15 Fig. 12.
Figure 16:
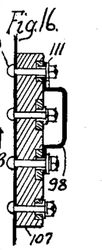
Fig. 16 is a vertical section on line 16—16 Fig. 12.

The "one mile per revolution" wheel of the speedometer opens and closes the switch 84, Figs. 9, 10 and 11. The switch 84 opening the circuit, spring 175a returns cores 174 and 174a, lever 172 and pawl 163 to original position; thus completing one cycle of movement. Each cycle advances the route sheet one mile to scale.

Positioning 160 Fig. 33 to extreme right engages pawl 163a with spur gears 164 and 183, and simultaneously reversing switch 169 closes the electric circuit at this point. Closing of electric circuit at switch 84 energizes solenoid 170a; core 174a moves to the center of magnetic field, compresses spring 175 and through pawl 163a rotates spur gears 164 and 183. Spur gear 183 engaging and rotating spur gear 179a and finally reel 19a. Similar cycle to that described for extreme left movement of lever 160 results, except the movement of route sheet 10a is reversed.

Figure 32:
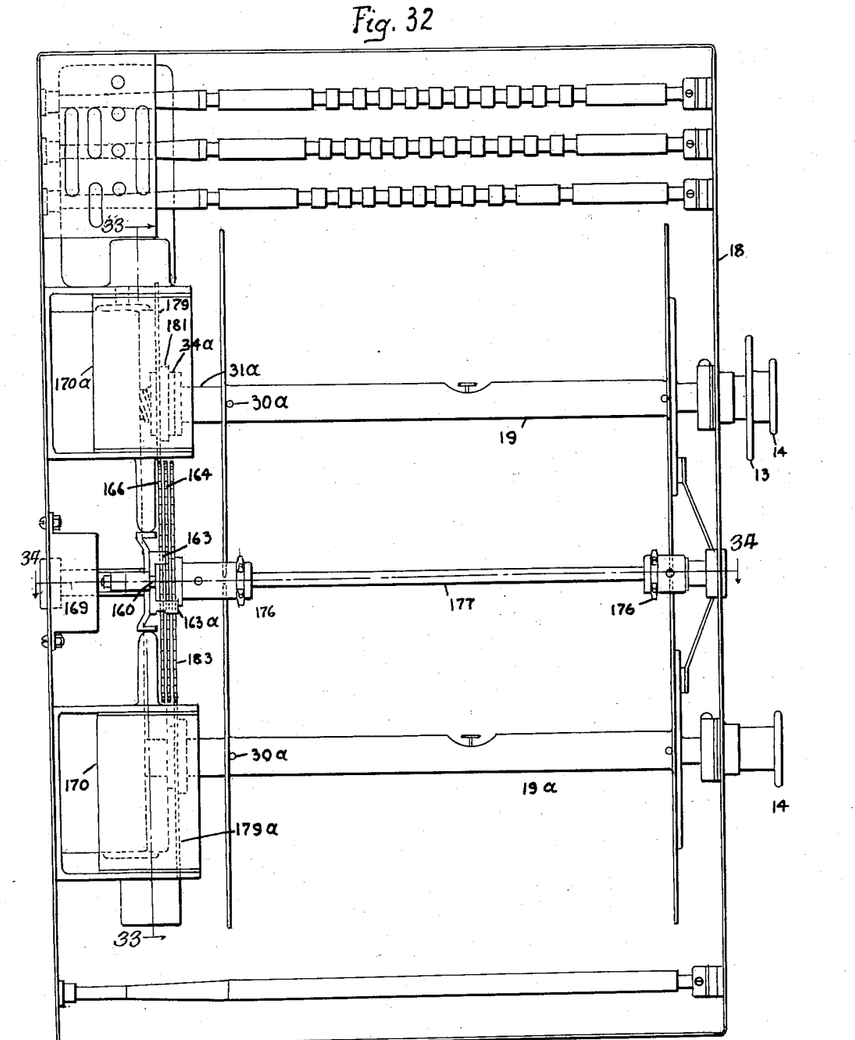
Fig. 32 is a plan view illustrating the construction of the mechanism which rotates the sprocket wheels engaging with, moving and timing the route sheet, also rotating the route sheet reels.

The switch 169 Figs. 32 and 34 contains contactors 88, 88a, 89, 89a, 89b and 90, as illustrated in elementary wiring diagrams Figs. 9, 10 and 11.

Fig. 9 illustrates all switches in open position. Fig. 10 illustrates switch 85 closed and switch 84 connected to the "one mile per revolution" wheel of speedometer is closed and switch 169 is closed in circuit with solenoid 170. Current flows from electric generator 86 through conductor to switch 85, thence to contactor 87 and to contactor 157; through contactor 88a to contactor 89a, thence to switch 84 and solenoid 170. From solenoid 170 through conductor to contactors 89, 88 and 90 and through conductor to electric generator 86 completing the circuit.

Fig. 11 illustrates switches 85, 84 and 169 closed and in circuit with solenoid 170a. Current from generator 86 flows through switch 85, contactors 87, 88, 89b to solenoid 170a; thence to switch 84 to contactors 89a, 88a and 90 to generator 86 completing the circuit.

The indicator 189 Fig. 34 is positioned over "route" by manually moving button 188 laterally in slot in cover 17.

Sprocket shaft 177 rotates in bearings 190 and 191 each fastened to cover 17.

Certain features of the present invention are specifically illustrated; I wish it understood, however, that various changes in form and methods of operation can be used within the scope of the appended claims. Direct control by speedometer is shown, similarly any other source of control can be used when timed to the movement of an automobile, car or other conveyance over a route. Similarly, although magnets are shown, other means electrically operated, for example, step or impulse motors may be used. Similarly a cylinder fitted with plunger and operated by fluids or gases can replace electric drive. Similarly the material and finish of the several parts employed may be such as the experience of the manufacturer may dictate or varying uses demand.

Having thus described my invention, what I claim and desire to patent is:

1. In an apparatus displaying a map and a route of a plurality of maps and routes respectively noted on sheets and an indicator traversing said routes, the combination of a case with removable cover having a window therein, a gear casing secured to and reels and guide rollers mounted in said case, means of assembling with and removal of said reels from case, mechanism including a motor to rotate said reels, electric means and a source of current to control the rotation of said motor; a route and information sheet secured to and adapted to travel from one to the other of said reels and having its intermediate portion passing over said rollers and under window and having noted on both margins thereof scales of miles, numbered groups of routes, numbered routes, forming said groups and in relative position on said routes the names of cities, towns, villages and intersecting routes by number and longitudinally between said margins and noted under each route said names, information and advertisement; a speedometer and mechanism connected to and timed to move said indicator in either direction of traverse of said scale of miles a distance equivalent to one mile for each mile recorded on said speedometer; hand rotated reels and guide rollers mounted in said case, a map sheet secured to and adapted to travel in either direction from one to the other of said hand rotated reels and having its intermediate portion passing under said rollers and over window and means maintaining a tension in said sheets.

2. In an apparatus displaying a map and a route of a plurality of maps and routes respectively noted on sheets and an indicator traversing said route, the combination of a case with removable cover having a rectangular opening therein covered with transparent material forming a window, a gear casing secured to and reels and guide rollers mounted in said case; pins fastened to said reels engaging flanged sleeves slidably engaging screws fastened to sleeve supported in said case, right and left hand screws rotatably connected to said flanged sleeves and sleeves, engaging and disengaging reels, limited linear movement of said screws permitting free rotation of said reels, a hand operated disc attached to one of said sleeves rotates corresponding reel; mechanism including a motor to rotate said reels, electric means and a source of current to control rotation of said motor; a route and information sheet having notations thereon secured to and adapted to travel from one to the other of said reels and having its intermediate portion passing over said rollers and under window; a speedometer and mechanism connected to and timed to move said indicator in either direction of traverse of said route a distance equivalent to one mile for each mile recorded on said speedometer; hand rotated reels and guide rollers mounted in said cover, a map sheet secured to and adapted to travel from one to the other of said reels and having its intermediate portion passing under said rollers and over window; means to maintain tension in said sheets and a lamp to illuminate said route and information sheet.

3. In an apparatus displaying a map of a plurality of maps noted on a sheet, a route and information sheet having notations thereon and a route traversing indicator, the combination of a case with removable cover having a window therein, a gear casing secured to and reels and guide rollers mounted in said case, means of assembly with and removal of said reels from case, a motor to rotate said reels, electric means controlling the rotation of said motor; a motor shaft and slidably mounted thereon and rotated thereby worms formed on a worm sleeve, said worms engaging selectively with worm wheels; one of said worm wheels fastened to a threaded pin engaging a clutch nut engaged with a clutch sleeve slidably mounted on said threaded pin, a spring normally urging said clutch sleeve engagement and corresponding reel engaging said clutch sleeve, reversing rotation of said motor shaft disengaging said worm and wheel through lateral movement of said worm sleeve and the other of said worms engaging worm wheel fastened to pin engaging corresponding reel; said route and information sheet is secured to and adapted to travel from one to the other of said reels and having its intermediate portion passing over said rollers and under window; a speedometer and mechanism connected to and timed to move said indicator in either direction of traverse of said route a distance equivalent to one mile for each mile recorded on said speedometer, hand rotated reels and guide rollers mounted in said case cover, a map sheet secured to and adapted to travel in either direction from one to the other of said reels and having its intermediate portion passing under said rollers and over window and means to maintain tension in said sheets.

4. In an apparatus displaying a map of a plurality of maps noted on a sheet, a route and information sheet having notations thereon and a route traversing indicator, the combination of a case with a removable cover having a window therein, a gear casing secured to and reels and guide rollers mounted in said case, means of assembling with and removal of said reels from case, mechanism including a motor to rotate reels, electric means and a source of current to control the rotation of said motor; a motor shaft rotating a worm sleeve slidably mounted thereon, a lever attached to a switch and slidably engaging with and vibrated by lateral movement of said worm sleeve, said switch connected in motor circuit and when master switch is in open position mechanism engages with clutch rotated reel; a route and information sheet secured to and adapted to travel from one to the other of said reels and having its intermediate portion passing over said rollers and under window, means actuating a speedometer and timed to move said indicator in either direction of traverse of said sheet a distance equivalent to one mile for each mile traversed on said speedometer; hand rotated reels and guide rollers mounted in said case cover, a map sheet secured to and adapted to travel from one to the other of said reels and having its intermediate portion passing under said rollers and over window and means to maintain tension in said sheets.

5. In an apparatus displaying a map and a route of a plurality of maps and routes noted on sheets and a route traversing indicator, the combination of a case with removable cover having a window therein, a gear casing secured to and reels and guide rollers mounted in said case, means of assembly with and removal of said reels from case, mechanism including a motor to rotate said reels, electric means and a source of current to control the rotation of said motor, a route and information sheet having notations thereon and secured to and adapted to travel from one to the other of said reels and having its intermediate portion passing over said rollers and under window; means actuating a speedometer, a pinion shaft attached to said speedometer and engaging a gear rotatably mounted on indicator screw and flexibly attached thereto by ratchet and pawl, said indicator fastened to a nut slidably mounted on said indicator screw, a thread guide attached to said nut and engaging selectively with right or left hand screw, the formation of said thread guide and joining ends of said threads, permitting said engaging; means for positioning said indicator by hand, hand rotated reels and guide rollers mounted in said cover, a map sheet secured to and adapted to travel from one to the other of said reels and having its intermediate portion passing under said rollers and over window and means to maintain tension in said sheets.

6. In an apparatus displaying any map selectively of a plurality of maps noted on a sheet, any route selectively of a plurality of routes noted on a route and information sheet and indicator traversing said route and information sheet, the combination of a case with a removable cover having a window therein, a gear casing secured to and reels, guide and circuit breaker rollers mounted in said case, means of assemblying with and removal of said reels from case, mechanism including a motor to rotate said reels, electric means and a source of current to control the rotation of said motor, said route and information sheet secured to and adapted to travel from one to the other of said reels and having its intermediate portion passing over said rollers and under window and being formed with perforations in two longitudinal zones, means for positioning route under window and interlock circuit breaker elements in combination with circuit breaker elements of said means positioning said route selectively from a plurality of routes in either direction of movement of said route and information sheet; a speedometer and mechanism connected to and timed to move said indicator in either direction of traverse of said route a distance equivalent to one mile for each mile recorded on said speedometer; hand rotated reels and guide rollers mounted in said cover, a map sheet secured to and adapted to travel from one to the other of said reels and having its intermediate portion passing under said rollers and over window and means to maintain tension in said sheets.

7. In an apparatus displaying any map of a plurality of maps noted on a sheet, any route selectively of a plurality of routes noted on a route and information sheet and indicator traversing said route and information sheet, the combination of a case with a removable cover having a window therein, a gear casing secured to and reels, guide and circuit breaker rollers mounted in said case, means of assembly with and removal of said reels from case, mechanism including a motor to rotate said reels, electric means and source of current to control the rotation of said motor; said route and information sheet secured to and adapted to travel from one to the other of said reels and having noted thereon mileage scales, groups of routes, information and advertisements and being formed with perforations indicating each group of routes and each route of said groups; hand operated means positioning circuit breaker and interlocking circuit breaker elements corresponding with respective route groups and route perforations on said sheet, numbers and letters arranged parallel with slots in said cover and positioned over respective columns of said perforations, stops on said cover adjacent figures and letters positioning said elements corresponding to perforations in registration with said elements when route and information sheet is stopped; a speedometer and mechanism connected to and timed to move said indicator in either direction of traverse of said scale of miles a distance equivalent to one mile for each mile recorded on said speedometer, hand rotated reels and guide rollers mounted in said cover, map sheet secured to and adapted to travel from one to the other of said reels and having its intermediate portion passing under said rollers, over window and means to maintain tension in said sheets.

8. In an apparatus displaying any map selectively of a plurality of maps noted on a sheet, any route selectively of a plurality of routes noted on a route and information sheet and indicator traversing said route and information sheet, the combination of a case with a removable cover having a window therein, a gear casing secured to and reels, guide and circuit breaker rollers mounted in said case; means of assembly with and removal of said reels from case, mechanism including a motor to rotate said reels; a route and information sheet secured to and adapted to travel from one to the other of said reels and having its intermediate portion passing over said rollers, under window and being formed with perforations in two longitudinal zones, means positioning circuit breaker and interlock circuit breaker elements; a reversing switch slideably mounted in said case cover engaging selectively contactors on bracket fastened to said case, contactor bars fastened to said cover selectively engaging contactors on said bracket, conductors in motor circuit connected selectively to contactors on said bracket, contactors of said elements engaging said contactor bars, wheels attached to said elements arranged to engage the surface of said route and information sheet closing circuit breakers and adapted to extend into grooves in said circuit breaker rollers through said perforations and opening said circuit breakers; a speedometer and mechanism connected to and timed to move said indicator in either direction of traverse of said route and information sheet a distance equivalent to one mile for each mile recorded on the speedometer; hand rotated reels and guide rollers mounted in said cover, map sheet secured to and adapted to travel from one to the other of said hand operated reels and having its intermediate portion passing under said rollers and over window and means to maintain a tension in said sheets.

9. In an apparatus displaying a map and route of a plurality of maps and routes respectively noted on sheets and an indicator traversing said route, the combination of a case with removable cover having a window therein, a gear casing secured to and reels and guide rollers mounted in said case, means of assembling with and removal of said reels from case, mechanism including a motor to rotate said reels, electric means and a source of current to control the rotation of said motor, a route and information sheet secured to and adapted to travel from one to the other of said reels and having its intermediate portion passing over said rollers and under window and having notations thereon; magnets fastened to said cover, means and a source of current to intermittently energize said magnets and timed to the movement of a conveyance over a route, a contactor vibrating between cores of said magnets and having fastened thereto a pawl engaging a ratchet sleeve rotatably mounted on indicator screw, a holding pawl fastened to said cover and engaging a ratchet preventing retrograde movement of said ratchet sleeve; a pawl attached to a wheel fastened to said indicator screw and engaging said ratchet sleeve; selective engagement of threads of indicator screw with thread guide attached to a nut fastened to and moving said indicator over sheet, means for positioning indicator by hand; hand rotated reels and guide rollers mounted in said cover, map sheet secured to and adapted to travel in either direction from one to the other of said reels and having its intermediate portion passing under said rollers and over window, and means to maintain tension in said sheets.

10. In an apparatus displaying any map selectively of a plurality of maps noted on a sheet, any route selectively of a plurality of routes noted on a route and information sheet traversing a comparatively nonmoving indicator, the combination of a case with a removable cover having a window therein, a gear casing secured to and reels and guide rollers mounted in said case, means of assembling with and removal of said reels from case, means including a motor to rotate said reels, electric means and a source of current to control rotation of said motor to place in reading position any route noted on said route and information sheet secured to and adapted to travel from one to the other of said reels and having its intermediate portion passing over said rollers and under window and having a scale of miles, notations and perforations in both margins thereof, sprocket wheels engaging said perforations, mechanism and electric means rotating said sprockets and moving the route and information sheet in either direction selectively under said indicator and the distance moved indicating on said scale of miles the miles traversed by a conveyance over a route and said indicator also positioned over route by hand; hand rotated reels and guide rollers mounted in said cover, map sheet secured to and adapted to travel from one to the other of said hand rotated reels and having its intermediate portion passing under said rollers and over window and means to maintain tension in said sheets.

11. In an apparatus displaying any map of a plurality of maps noted on a sheet, any route of a plurality of routes noted on a route and information sheet traversing an indicator, the combination of a case with removable cover having a window therein, a gear casing secured to and reels and guide rollers mounted in said case, means of assembly with and removal of said reels from case, means including a motor to rotate said reels, electric means and a source of current to control rotation of said motor; said route and information sheet secured to and adapted to travel from one to the other of said reels and having its intermediate portion passing over said rollers and under window and scales of miles, notations and perforations on both margins thereof; sprocket wheels engaging said perforations, a control lever pivotly mounted on a lever and attached to a reversing switch in circuit with the source of current, solenoids and a periodically current interrupting switch actuated by means responding to the movement of the conveyance; springs normally urging cores of solenoids into contact with said lever, means of energizing said solenoids selectively, mechanism translating linear movement of said cores into rotating movement of said sprockets and reels; hand rotated reels and guide rollers mounted in said cover, a map sheet secured to and adapted to travel from one to the other of said hand operated reels and having its intermediate portion passing under said rollers and over window and means to maintain tension in said sheets.

12. In an apparatus displaying any map of a plurality of maps noted on a sheet, any route of a plurality of routes noted on a route and information sheet traversing an indicator, the combination of a case with a removable cover having a window therein, a gear casing secured to and reels and guide rollers mounted in said case, means including a motor to rotate said reels, electric means and a source of current to control rotation of said motor; said route and information sheet secured to and adapted to travel from one to the other of said reels and having its intermediate portion passing over said rollers and under window and having scales of miles, notations and perforations on both margins; sprocket wheels attached to a shaft and engaging said perforations, a control lever pivoted mounted on a lever and attached to a reversing switch with a source of current, solenoids and a periodically current interrupting switch actuated by means responding to the movement of a conveyance, springs normally urging cores of said solenoids into contact with said lever; said control lever having pawls formed thereon and when rotated in either direction closing said reversing switch and held in set position by a spring connecting said control lever with lever pivotly mounted; one of said pawls engaging selectively spur gear attached to said shaft and spur gear rotatably mounted thereon and engaging gear flexibly attached by ratchet and pawl to pins engaging with said reels; a holding pawl fastened to said gear casing engaging with and preventing retrograde movement of said engaged spur gears; hand rotated reels and guide rollers mounted in said cover, a map sheet secured to and adapted to travel in either direction from one to the other of said hand operated reels and having its intermediate portion passing under said rollers and over window and means to maintain tension in said sheets.

WILLIAM SUMNER WILKINSON.